United States Patent [19]
Lin

[11] Patent Number: 5,367,987
[45] Date of Patent: Nov. 29, 1994

[54] DECORATIVE BUTTON FOR A PET COLLAR

[76] Inventor: Ray T. Lin, No. 34, Alley 4, Lane 37, Sec. 2, Chang Hsin Road, Hsin Chuan Li, Ho Mei Chen, Changhua Hsien, Taiwan, Prov. of China

[21] Appl. No.: 168,212

[22] Filed: Dec. 17, 1993

[51] Int. Cl.⁵ ............................................. A01K 29/00
[52] U.S. Cl. ............................................. 119/858
[58] Field of Search .................. 119/856, 858; 40/653, 40/301, 303; 24/108, 104, 90 B, 689, 682

[56] References Cited

U.S. PATENT DOCUMENTS

| | | | |
|---|---|---|---|
| 671,959 | 4/1901 | Haverly | 24/108 |
| 4,040,148 | 8/1977 | Fukumoto | 24/108 |
| 5,014,400 | 5/1991 | Ban | 24/108 |

*Primary Examiner*—Gene Mancene
*Assistant Examiner*—Thomas Price
*Attorney, Agent, or Firm*—Browdy and Neimark

[57] ABSTRACT

An improved decorative button of a pet collar, including a decorative cap, a resilient pad member and a decorative attaching paper. The decorative cap has a projecting rectangular rivet stem and a lower arch surface around the rivet stem corresponding to a curve of the pet collar. The resilient pad member is formed with a central rectangular hole corresponding to the rivet stem of the decorative cap. The rectangular hole of the resilient pad member has four slightly upward bent side edges. Each of four corners of the rectangular hole is formed with a linear fissure and a middle portion of each long side edge of the rectangular hole is also formed with a linear fissure, whereby the rivet stem is irreversibly fitted into the rectangular hole of the resilient pad member. The resilient pad member is resiliently deformed in accordance with the curve of the decorative cap and the pet collar so as to closely associate therewith without producing any clearance or unplane projecting portion.

1 Claim, 3 Drawing Sheets

DECORATIVE BUTTON FOR A PET COLLAR

BACKGROUND OF THE INVENTION

The present invention relates to an improved decorative button for a pet collar, including a decorative cap, a resilient pad member and a decorative attaching paper. The decorative cap has a projecting rectangular rivet stem. The resilient pad member is formed with a central rectangular hole corresponding to the rivet stem of the decorative cap. The rectangular hole of the resilient pad member has four slightly upwardly bent side edges. Each of four corners of the rectangular hole is formed with a linear fissure and a middle portion of each long side edge of the rectangular hole is also formed with a linear fissure, whereby the rivet stem is irreversibly fitted into the rectangular hole of the resilient pad member. The resilient pad member is resiliently deformed in accordance with the curve of the decorative cap and the pet collar so as to closely associate therewith without producing any clearance or nonplanar projecting portion.

A conventional pet collar has a decorative button as shown in FIG. 1. The decorative button has a downward extending rivet stem. The lower surface of the decorative button around the rivet stem is plane so that when the decorative button is secured on the pet collar, a clearance 10 is formed between the lower surface and a top surface of the pet collar as shown in FIG. 2. The hairs of a pet are liable to be clamped in the clearance and the pet may get hurt thereby.

It is therefore necessary to provide an improved decorative button for a pet collar, which can closely associate therewith so as to avoid a clearance in which the hairs of the pet mat are clamped as well as avoid a nonplanar projection which will abrade the neck of the pet and hurt the same.

SUMMARY OF THE INVENTION

It is a primary object of the present invention to provide an improved decorative button for a pet collar, which has a resilient pad member which can to be easily irreversibly fitted with the rivet stem of the decorative button so as to quickly preliminarily associate the decorative button and the pet collar.

It is a further object of the present invention to provide the above decorative button, wherein after the resilient pad member is fitted with the rivet stem of the decorative button, the rivet stem is punched to closely rivet the decorative button with the resilient pad member and the pet collar without producing any clearance between the decorative button and the pet collar.

It is still a further object of the present invention to provide the above decorative button, wherein after the rivet association, the resilient pad member is closely attached to the pet collar with a smooth surface so as to maintain a desirable appearance and avoid injuring of the pet.

The present invention can be best understood through the following description and accompanying drawing, wherein:

DETAILED DESCRIPTION OF THE PREFERRED EMBODIMENT

Figure 1:
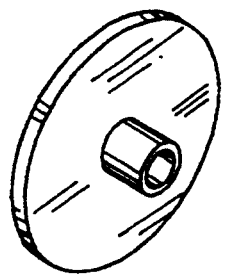
FIG. 1 is a perspective view of a conventional decorative button of pet collar.
Figure 2:
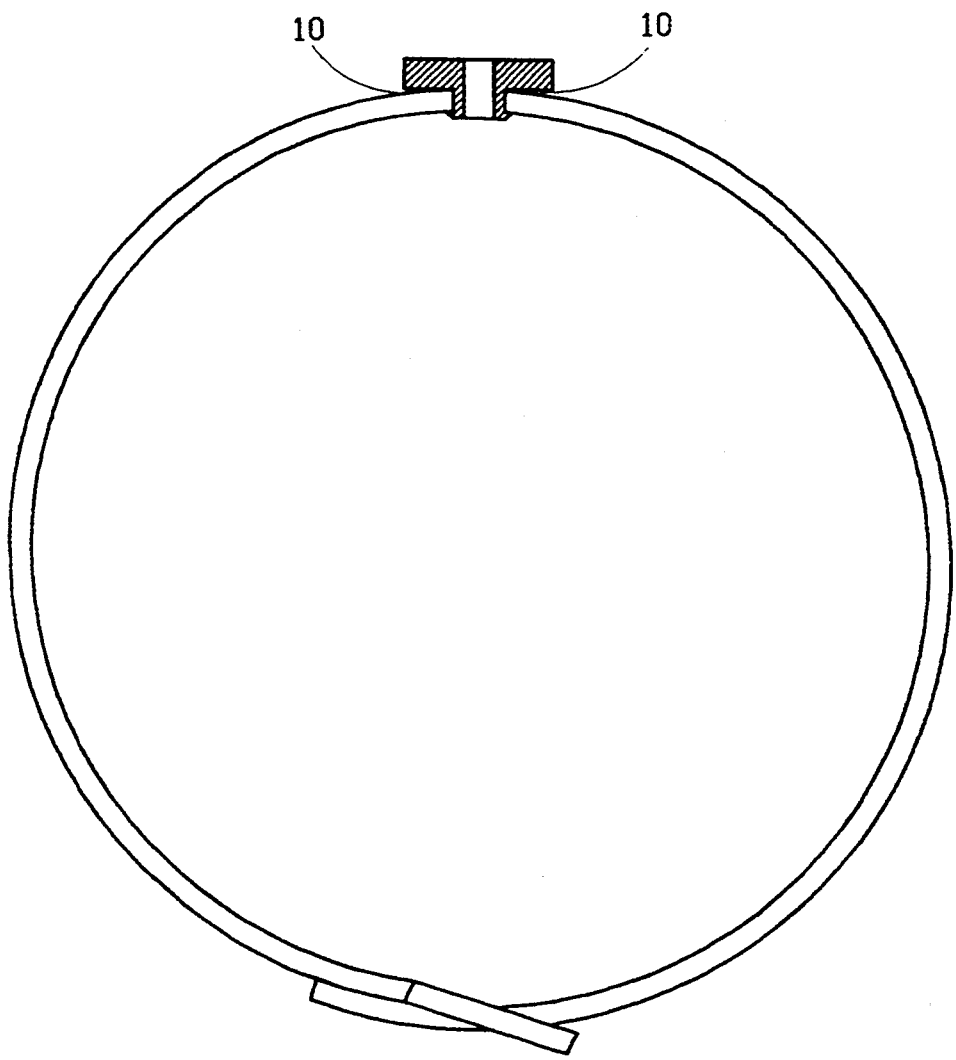
FIG. 2 is a sectional view showing the assembly of the decorative button and the pet collar.
Figure 3:
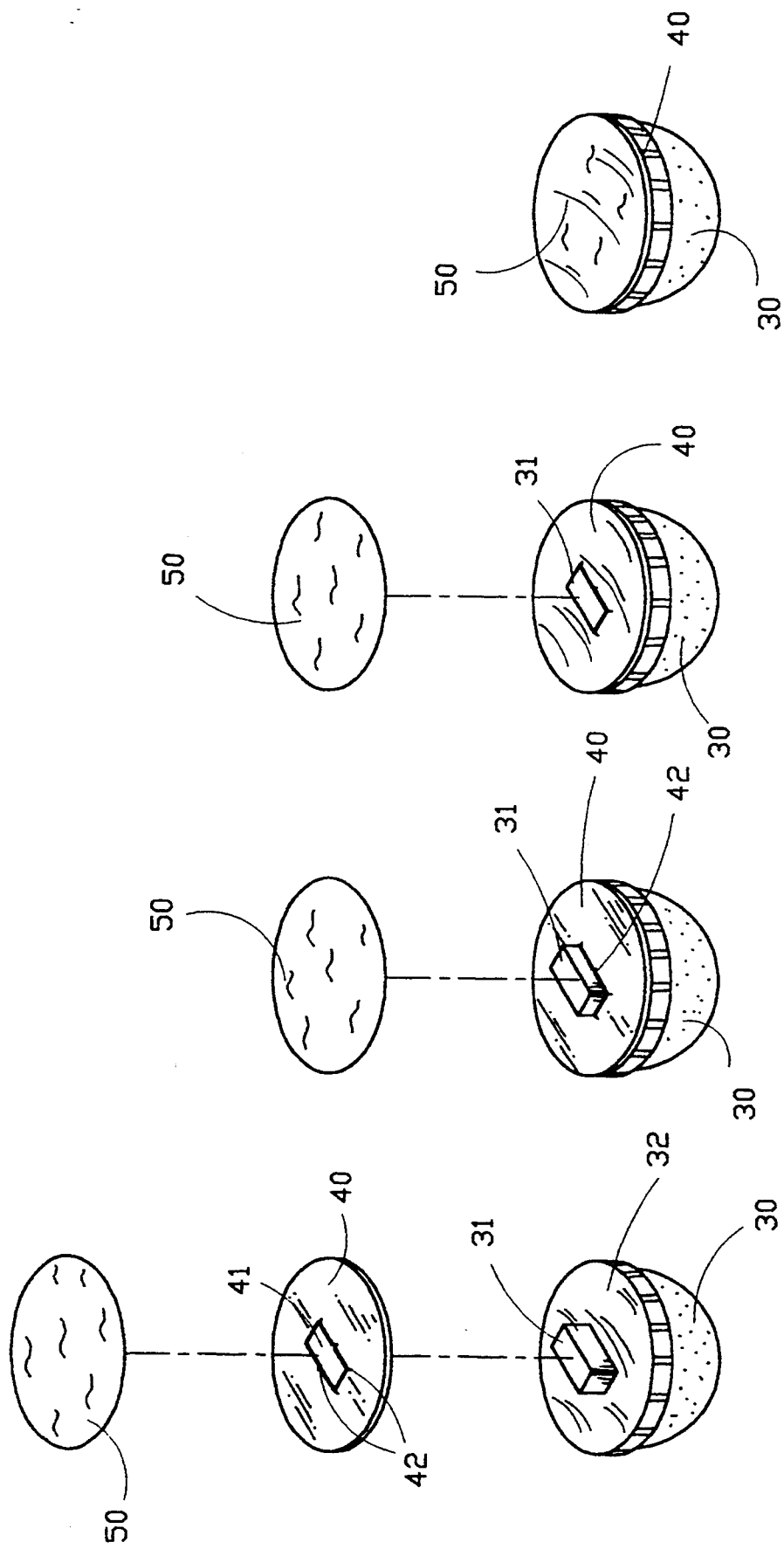
FIG. 3 is a perspective view showing the components of the decorative button of the present invention as well as the assembling procedure thereof.

Please refer to FIG. 3. The present invention includes a decorative cap 30, a resilient pad member 40 and a decorative attaching paper 50. The decorative cap 30 has a projecting rectangular rivet stem 31 and a lower arch surface 32 around the rivet stem 31 corresponding to a curve of a pet collar 60. The resilient pad member 40 is formed with a central rectangular hole 41 corresponding to the rivet stem 31 of the decorative cap 30. The rectangular hole 41 has four slightly upwardly bent side edges. Each of the corners of the rectangular hole 41 is formed with a linear fissure 42 and a middle portion of each long side edge of the rectangular hole 41 is also formed with a linear fissure 42, whereby the rivet stem 31 can be easily irreversibly inserted into the rectangular hole 41.

Figure 4:
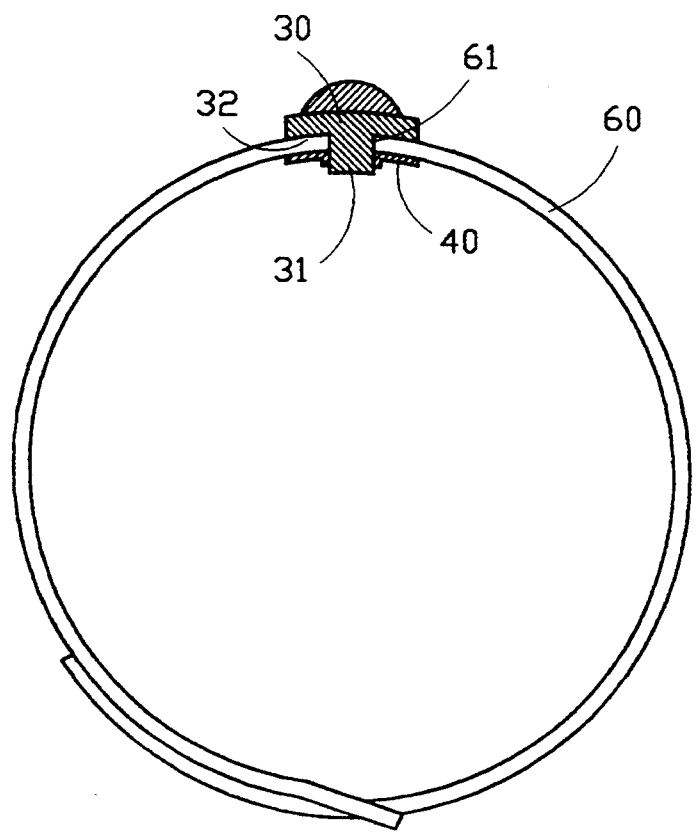
FIG. 4 is a sectional view showing the preliminarily associated decorative button and pet collar.
Figure 5:
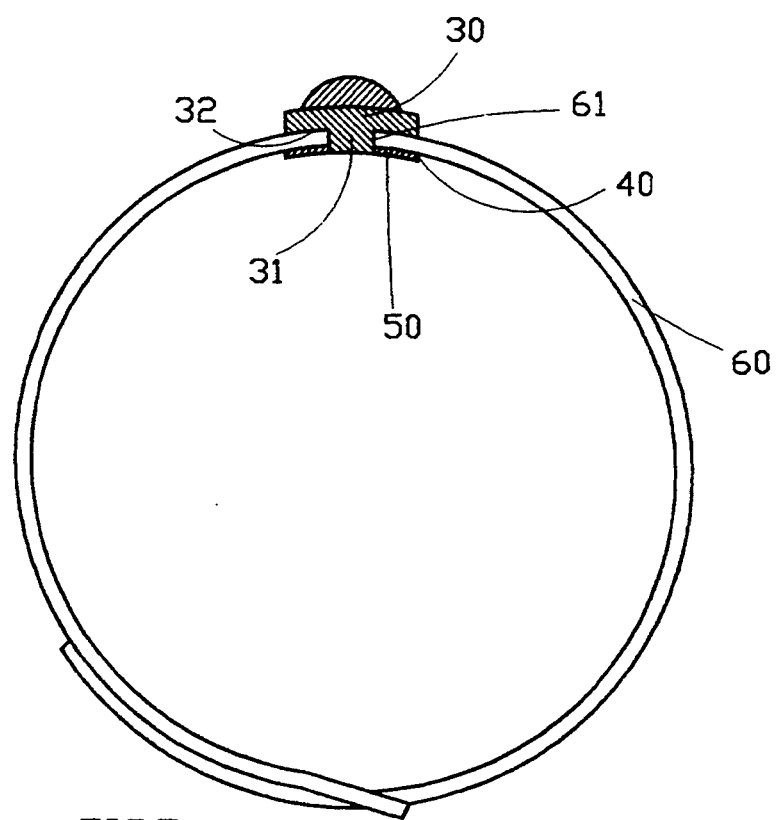
FIG. 5 is a sectional view according to FIG. 4, showing the completely associated decorative button and pet collar.

Please refer to FIG. 4. When assembled, the rivet stem 31 is first extended through an engaging hole 61 of the pet collar 60 to fit into the rectangular hole 41 of the resilient pad member 40. At this time, the pet collar 60 is clamped between the decorative cap 30 and the resilient pad member 40. After the rivet stem 31 is fitted into the rectangular hole 41 of the resilient pad member 40, the side edged thereof exert an anti-reversion force on the rivet stem 31 so as to preliminarily secure the decorative cap 30 on the pet collar 60.

As shown in FIG. 7, after the preliminary securing procedure, the rivet stem 31 is punched and expanded, forming a rivet to more firmly closely associate the decorative cap 30 with the resilient pad member 40 and the pet collar 60. In addition, the decorative attaching paper 31 is attached on the expanded rivet surface of the rivet stem 31 to make the surface more smooth.

According to the above arrangements, the decorative cap 30 can be closely secured on the pet collar 60 and the resilient pad member 40 can be resiliently deformed in accordance with the curve of the decorative cap 30 and the pet collar 60 so as to closely associate therewith without producing any clearance or unplane projecting portion. As a result, the hairs of the pet will not be clamped by the decorative button and the pet collar and the neck of the pet will not be hurt due to abrasion against a projecting portion of the decorative button. It is to be understood that the above description and drawings are only used for illustrating one embodiment of the present invention, not intended to limit the scope thereof. Any variation and derivation from the above description and drawings should be included in the scope of the present invention.

What is claimed is:

1. A decorative button of a pet collar, comprising a decorative cap, a resilient pad member and a decorative attaching paper, said decorative cap having a projecting rectangular rivet stem and a lower surface around said rivet stem, said resilient pad member being formed with a central rectangular hole corresponding to said rivet stem of said decorative cap, said decorative button being characterized in that said lower surface of said decorative cap is arch-shaped corresponding to a curve of the pet collar and said rectangular hole of said resilient pad member has four slightly upward bent side edges, each of four corners of said rectangular hole being formed with a linear fissure and a middle portion of each long side edge of said rectangular hole being also formed with a linear fissure, whereby when assembled, said rivet stem is first extended through an engaging hole of the pet collar to fit into said rectangular hole of said resilient pad member, with slightly upwardly bent side edges of said rectangular hole exerting an anti-reversion force on said rivet stem is punched and expanded, forming a rivet to more firmly closely associate said decorative cap with said resilient pad member and said pet collar, said decorative attaching paper being further attached on top of am expanded rivet surface of said rivet stem to cover said surface and thereby to make said surface more smooth, said resilient pad member being resiliently deformed in accordance with the curve of said decorative cap and said pet collar so as to closely associate therewith without producing any clearance or unplane projecting portion.

* * * * *